United States Patent [19]

Bonne

[11] Patent Number: 5,187,674
[45] Date of Patent: Feb. 16, 1993

[54] VERSATILE, OVERPRESSURE PROOF, ABSOLUTE PRESSURE SENSOR

[75] Inventor: Ulrich Bonne, Hopkins, Minn.

[73] Assignee: Honeywell Inc., Minneapolis, Minn.

[21] Appl. No.: 458,062

[22] Filed: Dec. 28, 1989

[51] Int. Cl.⁵ .............................................. G01N 9/00
[52] U.S. Cl. .................................. 364/558; 73/204.26; 364/556; 374/43
[58] Field of Search ...................... 364/556–558; 73/25.03, 23.31, 25.04, 23.22, 204.16, 204.18, 204.25, 204.17, 204.21, 204.26; 374/29, 43, 44, 183

[56] References Cited

U.S. PATENT DOCUMENTS

| | | | |
|---|---|---|---|
| 4,254,654 | 3/1981 | Clouser et al. | 73/23.4 |
| 4,381,154 | 4/1983 | Hammond, III | 374/43 |
| 4,461,166 | 7/1984 | Gatten et al. | 73/25.03 |
| 4,478,076 | 10/1984 | Bohrer | 73/204.26 |
| 4,478,077 | 10/1984 | Bohrer et al. | 73/204.26 |
| 4,594,879 | 6/1986 | Maeda et al. | 73/25.03 |
| 4,630,938 | 12/1986 | Piorkowska-Palczewska | 374/44 |
| 4,651,564 | 3/1987 | Johnson et al. | 73/204.26 |
| 4,697,165 | 9/1987 | Ishiguro et al. | 73/23.31 |
| 4,734,641 | 3/1988 | Byrd, Jr. et al. | 374/183 |
| 4,735,082 | 4/1988 | Kolloff | 73/25.03 |
| 4,739,657 | 4/1988 | Higashi et al. | 73/204.18 |
| 4,741,198 | 5/1988 | Farren et al. | 73/23.4 |
| 4,783,996 | 11/1988 | Ohta et al. | 73/204.26 |
| 4,825,693 | 5/1989 | Bohrer et al. | 73/204.25 |
| 4,914,742 | 4/1990 | Higashi et al. | 73/204.26 |
| 4,944,035 | 7/1990 | Aagard et al. | 364/556 |
| 4,956,793 | 9/1990 | Bonne et al. | 374/43 |
| 4,966,037 | 10/1990 | Sumner et al. | 73/204.26 |

Primary Examiner—Kevin J. Teska
Attorney, Agent, or Firm—Michael B. Atlass; Omund R. Dahle

[57] ABSTRACT

A non membrane-based overpressure proof gas pressure microsensor. It is not a membrane-based microsensor but is based on an open microbridge sensor structure. A method and apparatus is described to determine gas pressure from thermal conductivity, k, and volumetric specific heat, $c_{pv}$, as well as pressure, P, using a microbridge sensor.

13 Claims, 13 Drawing Sheets

THERMAL DIFFUSIVITY SENSOR OR
SPECIFIC HEAT SENSOR

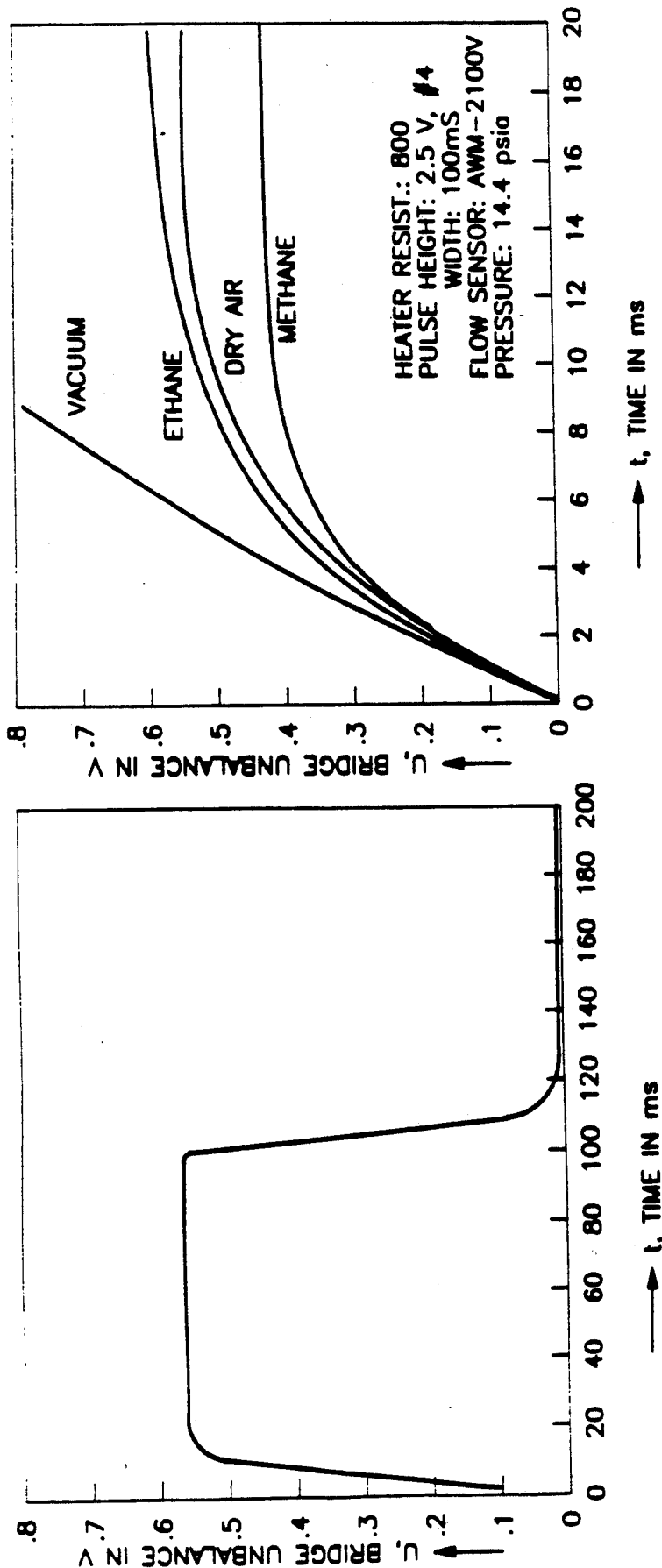

HEAT-UP TIME VS. PRESSURE AND GAS TYPE
USING AN OFF-THE-SHELF FLOW SENSOR
OF CONFIGURATION 7b
SENS-HTR-GAP-HTR-SENS
PULSE HEIGHT: 2.5V
WIDTH: 100ms

THERMAL CONDUCTIVITY DETERMINATION
USING AN OFF-THE SHELF FLOW
SENSOR OF CONFIGURATION 7c
PULSE HEIGHT: 4.0V
WIDTH: 100ms

HEAT-UP TIME VS. PRESSURE AND GAS TYPE USING AN OFF-THE-SHELF FLOW SENSOR OF CONFIGURATION 7c
HTR—-GAP—-SENS
PULSE HEIGHT: 1.75V
WIDTH: 100ms

HEAT-UP TIME VS. PRESSURE AND GAS TYPE USING AN OFF-THE-SHELF FLOW SENSOR OF CONFIGURATION 7b
SENS-HTR-GAP-HTR-SENS
PULSE HEIGHT: 2.5V
WIDTH: 100ms

HEAT-UP TIME VS. PRESSURE AND GAS TYPE
PULSE HEIGHT: 3V #4
WIDTH: 100ms
FLOW SENSOR: AWM-2100V

COOLING TIME VS. PRESSURE AND GAS TYPE,
USING AN OFF-THE-SHELF FLOW SENSOR
M-S OF CONFIGURATION 7b
SENS-HTR-GAP-HTR-SENS
PULSE HEIGHT: 2.5V
WIDTH: 100ms $P = -2.2695 + 956.95c_p{}^{.84392} + .0011537k_c{}^{1.8715} - .67065 \cdot 10^{-6}k_h$ AT 120°C $c_p = cal/(°C\ cm^3)$
$k_c = \mu cal/(s\ cm\ °C)$ AT 70°C, $k_h$ AT 120°C

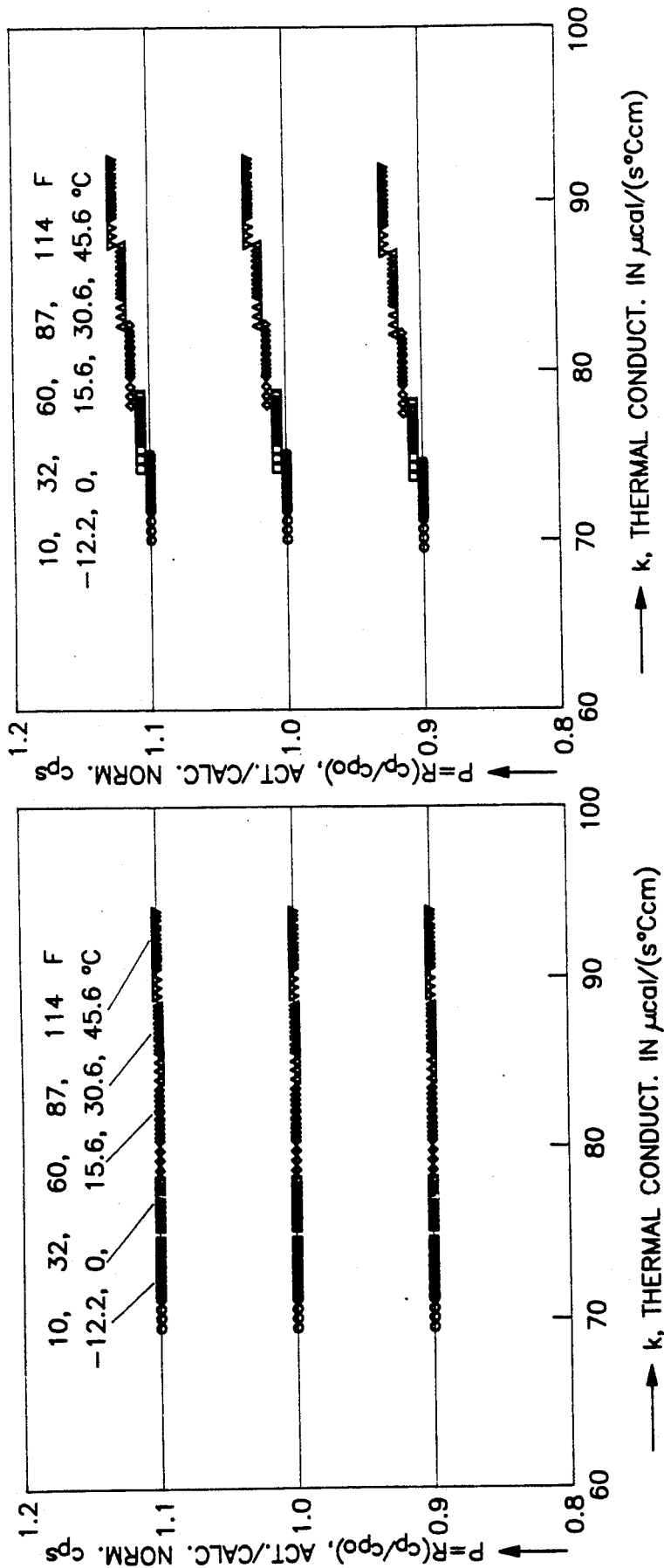

$c_p/c_{po} = 7.433658e-C2+.9257489((k_o/k)/(T_o/T)(T_o/T)^{0.3})-1.666286$

VERSATILE, OVERPRESSURE PROOF, ABSOLUTE PRESSURE SENSOR

BACKGROUND OF THE INVENTION

1. Field of the Invention

The present invention relates to a non membrane-based gas pressure microsensor. It is based on the microbridge flow sensor and since it is not membrane-based it is not subject to breakage caused by overpressure. It describes a method to determine gas pressure from basically thermal conductivity, k, and specific heat, $c_{pv}$.

2. Background

Prior art gas pressure microsensors are typically based on sensing the deflection of a membrane either piezoresistively or capacitatively, with inherent limitations imposed by allowable maximum pressure to avoid membrane breakage and by acceptable sensitivity at the low pressure end. Over-pressure protection is needed and costly. A non membrane-based absolute pressure microsensor is based on sensing thermal conductivity, but has a limited high pressure range and has a somewhat gas composition dependent output.

SUMMARY OF THE INVENTION

The present invention presents a new "high accuracy", wide range, absolute or differential pressure microsensor, based on a microbridge sensor, in a situation where the gas composition is known. The present invention also presents a "medium accuracy" (max error<0.1%), wide range, absolute or differential pressure microsensor if the gas composition is only approximately known or is not known. This microsensor is not membrane-based and therefore is not subject to breakage through overpressure. Thermal conductivity, k, and specific heat, $c_{pv}$, can be measured with the microbridge and herein a method is shown to determine gas pressure from k and $c_{pv}$.

BRIEF DESCRIPTION OF THE DRAWINGS

FIGS. 4-18 are supporting figures.

FIGS. 4 and 5 are typical circuits for use with the sensors of FIGS. 1-3.

FIG. 6 is a schematic representation of sensor time/temperature response curves caused by an electric pulse to a film heater element.

FIG. 8 is a scanning-electron-microscope (SEM) photo of the microstructure of a typical microbridge sensor.

FIG. 9 is a partial schematic and block diagram of a circuit for use with a sensor as depicted in FIG. 7(b) in accordance with the invention.

FIG. 10 is a schematic block diagram of the system of the invention including calibration and use functions.

FIG. 11 is a scope trace representing the temperature signal rise versus time, for the configuration of FIG. 7(c) in response to a heater a pulse to the heater of a microbridge located in dry air at atmospheric pressure.

FIG. 12 is a graphical representation of the temperature signal rise versus time, for the configuration of FIG. 7(c) in response to the heater pulse for various gases at atmospheric pressure as indicated.

FIG. 13 is a graphical representation of thermal conductivity determination based on the bridge output of FIG. 9(a).

FIG. 14 is a theoretical graphical representation of sensor heat-up time versus pressure for several gases using the sensor configuration of FIG. 7b.

FIG. 15 is similar to FIG. 14 based on data taken by a sensor of the type depicted in FIG. 7(b) calculated in accordance with the invention.

FIG. 16 is a graphical representation of sensor heat-up time versus pressure for several gases using the sensor configuration of FIG. 7c.

FIG. 17 is a graphical representation of sensor cooling time versus pressure for several gases using the sensor configuration of FIG. 7c.

FIG. 18 is a graphical presentation of the heat-up time versus pressure and gas type according to the invention.

FIG. 21 is a graphical presentation of gas pressure versus thermal conductivity for 78 natural gases and several gas temperatures. ($\mu$B 15° C. higher) $k_s$ and $c_{ps}$ at 1 atm and 15.6° C.

FIG. 22 is a graphical presentation of gas pressure versus thermal conductivity for 78 natural gases and several gas temperatures ($\mu$B 15° C. higher) $k_s$ and $c_{ps}$ at 1 atm and $-12.2°$ C.

DETAILED DESCRIPTION

This invention is directed to a non membrane-based, overpressure-proof, absolute pressure sensor of the microbridge sensor type. The principle on which this pressure sensor operates includes that of sensing specific heat, $c_p$, with a pulsed microbridge heater, as is taught in the co-pending applications Ser. No. 210,892, filed Jun. 24, 1988, entitled "Measurement of Thermal Conductivity and Specific Heat", and Ser. No. 211,200, filed Jun. 24, 1988, entitled "Calibration of Thermal Conductivity and Specific Heat Devices", both co-pending applications being assigned to the same assignee as the present application, which principle shows that the signal generated by a sensor next to the heater is related to volumetric specific heat, $c_{pv}$, for example, in units of cal/(cm$^3$C). Ser. No. 07/210,892 has issued as U.S. Pat. No. 4,955,035, and Ser. No. 07/211,200 was abandoned and continued as Ser. No. 07/504/063. The sensor output is pressure dependent and is composition dependent.

The relation between molar (or weight)-based specific heat, $c_p$, and volumetric specific heat, $c_{pv}$, leads to the ability to determine pressure, P, according to the relation:

$$c_p = C_{pv} V_{Mo}(T/T_o) (P_o/P)$$

where $c_p$ = specific heat, (molar or weight)-based $c_{pv}$ = volumetric specific heat $V_{Mo}$ = molar volume of ideal gases = 22415 cm³/mol @273.15° and 760 mm Mercury of pressure T = sensed gas temperature in °K.

$T_o$ = gas temperature at the reference condition of 273.15°K.

$P_o$ = gas pressure at the reference condition of 760 mm Mercury

P = actual gas pressure of the sensor

Figures 19, 20:
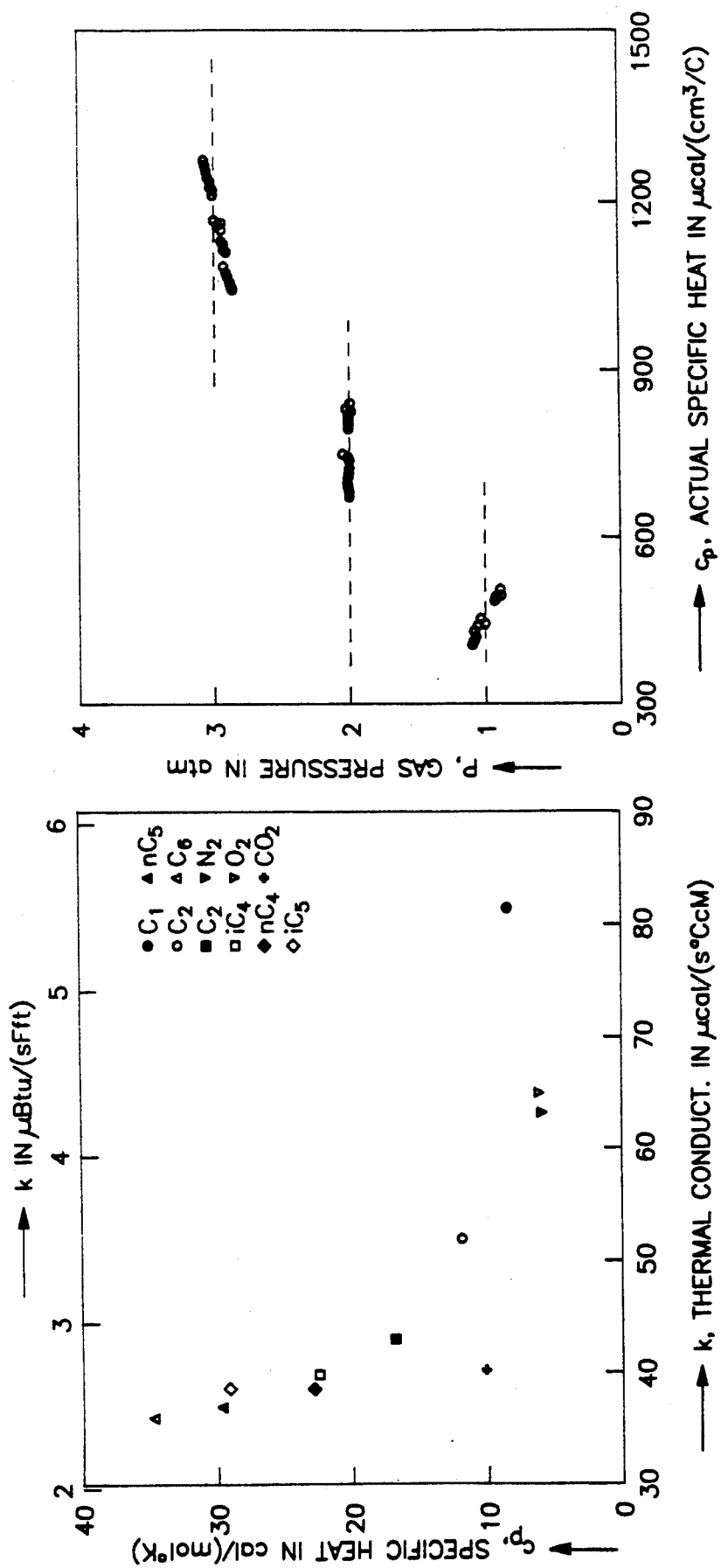
FIG. 19 is a graphical presentation of the specific heat of several gases versus thermal conductivity.
FIG. 20 is a graphical presentation showing a determination of pressure from the output of a standard microbridge sensor, used to sense $c_p$, $k_c$ and $k_h$.
Figure 24:
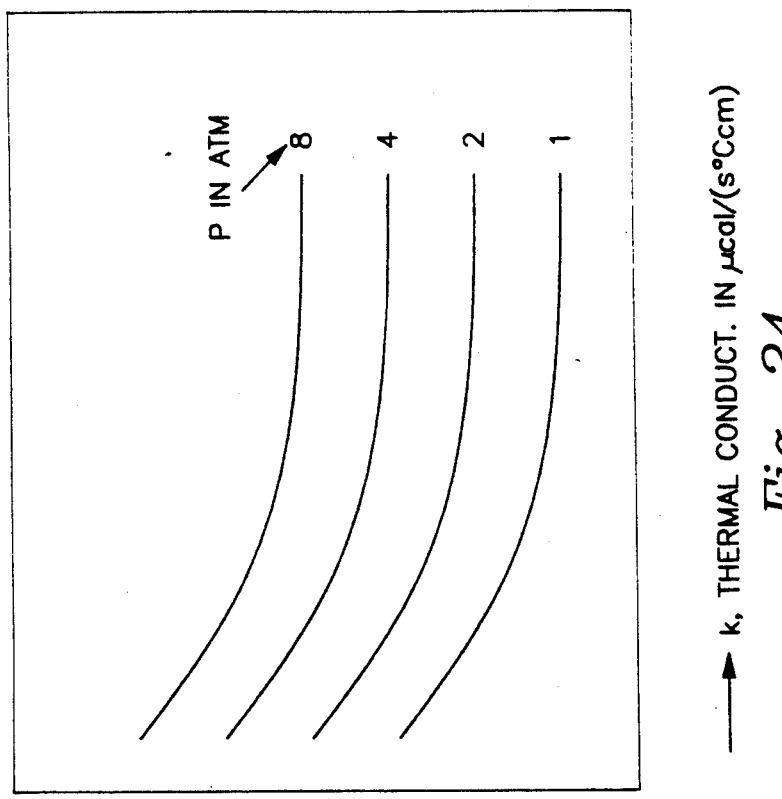
FIG. 24 is a graphical presentation of specific heat versus thermal conductivity at several pressures (1, 2, 4 and 8 atm).

In the equation above everything is known ($c_p$) or sensed (T and $c_{pv}$) if the gas composition is known, so that P can be computed. Referring to FIG. 19, which graphically shows specific heat, $c_p$, in cal/(mol °K.) versus thermal conductivity, k, in μ cal/(s° Ccm) or in μ Btu/(s F ft), FIG. 19 shows that for most gases used in fuels, there is a clear relation among the family of hydrocarbons, i.e. $c_p$ and 1/k increase as molecular weight increases. This relation only approximately extends to $N_2$, $O_2$ and $CO_2$ which also are part of such fuel gases, although mostly in low concentrations (exceptions: peak shaving gas and town or city gas, with sizeable amounts of CO, $H_2$, $N_2$ and $CO_2$.

The idea to be further discussed below is based on taking a small segment of FIG. 19, corresponding to the range of composition of natural gases, leading to average $c_p$ and k values near to those of methane, and to prove that even without knowing the exact composition within the chosen gas composition range, a meaningful determination of pressure, P, can be made.

Such a determination of P is needed for gas flow controls, combustion controls, and flow sensing devices (like gas meters) in order to eliminate the composition effect on the signal output of hot thin film (anemometer type) flow sensors; the use of regular pressure sensors would be too costly for such applications.

Several embodiments of this invention to obtain pressure have been conceived. FIG. 20 shows an early version in which the sensed $c_{pv}$ in cal/(cm³C), $k_h$ and $k_c$ are combined to compute P, for gases covering a wide range: 78 natural gases and 77 peak shaving gases (50% natural gas + 25% air + 25% propane). No attempt was made in this embodiment to increase the accuracy by also using measurable $c_{pv}$ at more than one temperature. Note that the output of one sensor, $c_{pv}$, is pressure sensitive, while that of the other one is not (or very little: 2.5%/atm near 1 atm); this is an important part of this pressure sensing method, which works without knowing the exact composition of the gas.

FIG. 21 which plots pressure, P, versus thermal conductivity, k, at various temperatures, shows the result of a more accurate method, although it requires more involved computations, to be discussed next.

First as is shown in co-pending application, Ser. No. 07/458,263 filed Dec. 28, 1989, Table 1 shows the result of deriving a number of algorithms to compute $k_s$ and $c_{ps}$, i.e., the properties at reference conditions of temperature, $T_s$ (and $P_s$), which were chosen as 60F (15.555° C.) and 14.73 psia (1 atm). The actual computations were made for 15° C. higher to allow for the influence of the microbridge heater on raising the average gas temperature around it. A set of over 60 natural gases used to derive these algorithms were chosen to represent a range of typical natural gases. They contain less than 2% each of $N_2$ or $CO_2$, no more than 0.1% $O_2$, and no less than 85% $CH_4$. The chosen temperature range is from −12.2 to 45.6° C. (10 to 114F).

The standard errors of the investigated algorithms vary from 5000 ppm (0.5%) down to 153 ppm, with maximum errors about 3 to 4×larger. For clarity sake the exponents of the listed polynomials have been omitted, although all are of the general form:

$$1/k_s \text{ or } 1/c_{ps} \text{ or } k_s \text{ or}$$

$$c_{ps} = A + BT^b + Ck^c + Dc_p^d + E(kT^x)^e + F(c_pT^y)^f + G(dk/dT)^g + H(dc_p/dT)^h \quad (1)$$

with one or more of the terms missing in order to simplify the expressions as much as possible.

The algorithms listed in Table 1 (an abbreviated Table) are preferred because the equations 3 and 4 achieved the lowest error, while equations 2 and 5 are preferred because they achieved a reasonably low error without requiring measurements at more than one microbridge heater temperature (low cost compromise).

The choices which were considered in converting the measured k and $c_p$ from the measurement* to the reference temperature (60° F., 15.555° C.) values $k_s$ and $c_{ps}$ are expressed in terms of the following functional relationships:

TABLE 1

| CONVERSION OF k AND $c_p$ TO REFERENCE TEMPERATURE | | | |
|---|---|---|---|
| | Errors | | |
| | Std. PPM | Max. PPM | Log. Sens. |
| $k_s$ = A + BT + Ck + D(kT) | 287 | 1931 | 2.00 |
| $k_s$ = A + BT + Ck + D(dk/dT) | 153 | | |
| $1/c_{ps}$ = A + BT + $Cc_p$ + $Ddc_p/dT$ | 165 | | |
| $c_{ps}$ = A + BT + C($c_p$/T) + D(kT) | 197 | 660 | 1.51 |

The coefficients and exponents for these four preferred algorithms are as follows, with all k-values in microcal/(s°Ccm), $c_p$ in cal/(mol° C.), T in °K.:

Eq. (6) above was also discovered during this study and is listed here as an additional, very useful relation.

As shown, the top two algorithms only involve inputs of thermal conductivity properties, while the bottom one was both k and $c_p$ inputs to compute $c_{ps}$.

Figure 23:
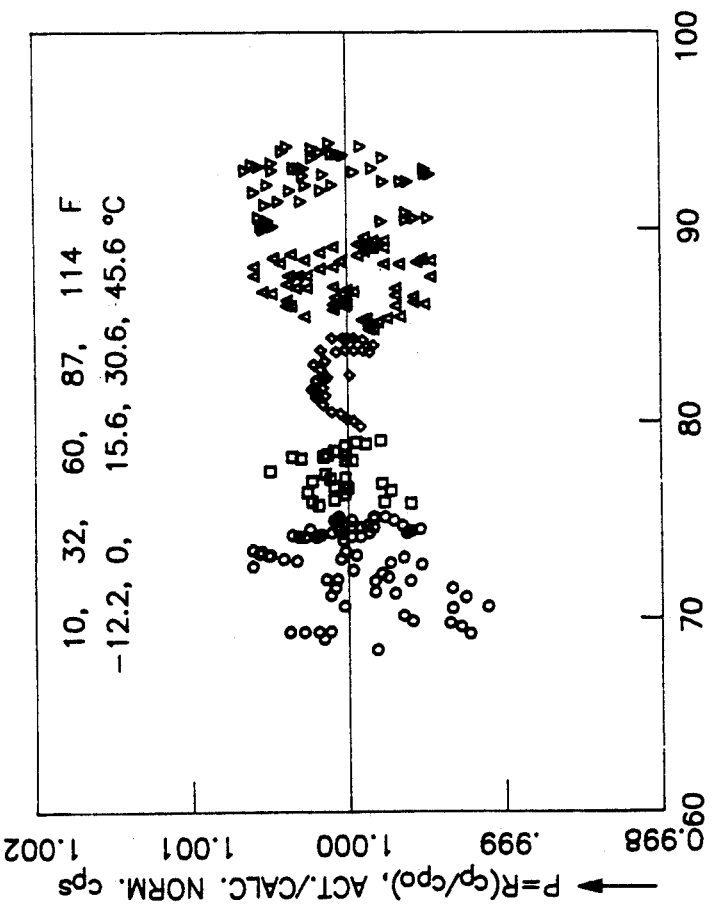
FIG. 23 is a graphical presentation of gas pressure versus thermal conductivity for 78 natural gases and several gas temperatures. ($\mu$B 15° C. higher) $k_s$ and $c_{ps}$ at 1 atm and 15.6° C. with iteration.

Secondly, the basis for the more accurate method mentioned above are the two algorithms eqs. (5) and (6), which compute $c_{ps}$ and $c_p/c_{ps}$, respectively: forming also $c_p/c_{ps}$ in the former and equating it to the latter, eliminates $c_{ps}$. Then, substituting the remaining $c_p$ by eq. (1) we obtain an equation for P:

$$P = c_{pv}T P_o V_{Mo}/T_o\{f(k,T)g(k,T)\} \quad (7)$$

where 260 < T < 310K, $P_o$ = 1 atm, $T_o$ = 273.15°K., $V_{MS}$ = 22415(T/$T_o$)($P_o$/P) cm³/mol, f(k,T) and g(k,T) are the right hand sides of eqs. (5) and (6), respectively, note that f(k,T) also contains a term with $c_p$ (see eq. (1)) and therefore with $P^c$ with c=1 listed in eq. (5) mentioned above, an iteration of the solution of P is needed. Results obtained with eq. (2) are as follows:

FIG. 21 shows a plot of 78 natural gases at 5 temperatures and three pressures, whereby actual values of k, $k_s$, T and $T_s$ were used to compute $c_p/c_{ps}$ with eq. (6); these were then converted to $c_{pv}/c_{pvs}$ ratios via eq. (1) for three pressures and compared (i.e. ratioed) to actual values of $c_p/c_{ps}$. The match between the points P = ($c_{pv}/c_{pvs}$)/($c_p$·$c_{ps}$) and the lines drawn for constant pressure of 0.9, 1.09 and 1.1 atm gives an indication of the accuracy of eq. (6): std. error of ±254 ppm and max. error of 1077 ppm. FIG. 22 shows that sizeable errors result if the incorrect reference temperature is used (−12.2.° C. rather than 15.6° C.). FIG. 23 presents a blown up version of the center part of FIG. 19 in order to visualize the error margin achieved by the computation; note that the maximum error, obtained with half of the natural gases not used for the derivation of the equations is still within +1500 ppm.

FIG. 23 presents a plot of the same gases, but now simulating a more comprehensive test of eq. (2): its solution was iterated to a value of P to within ±10 ppm by using the outputs of f(k,T) and q(k,T) from "sensed" k and T, and computing $k_s$ from eq. (8)

$$k_s = A + B\ T^b + Ck^c + D(kT)^d \qquad (8)$$

which was derived earlier as eq. (2); the "sensed" value of $c_{pv}$ is obtained experimentally via a method described in copending applications Ser. No. 210,892 filed Jun. 24, 1988 and Ser. No. 211,200 filed Jun. 24, 1988 and assigned to the same assignee as the present application.

The System

Thus the ability to measure pressure with a non membrane-based microbridge sensor has been shown above. In order to more fully appreciate the microbridge flow sensor system upon which the present method invention is utilized to extend the applicability thereof, the following description is supplied.

Figure 6:
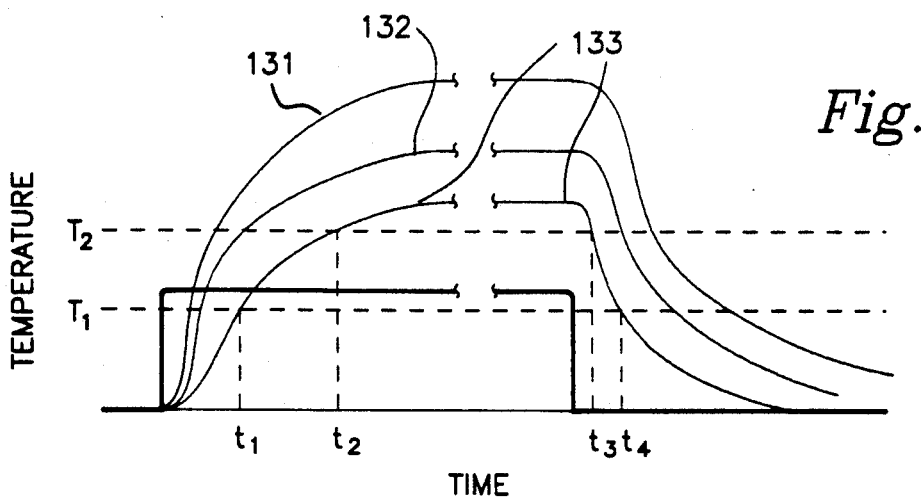

Thermal conductivity and specific heat of each fluid of interest produce characteristic transient and steady-state temperature reactions in a proximate sensor as exemplified in FIG. 6.

In the preferred implementation, specific temperatures, as $T_1$ and $T_2$ in FIG. 6, are selected as "marker" points with respect to the sensor. These marker points are used to reference the determination of the time periods, as $t_1-t_2$, required to achieve the corresponding temperature rise(s) or fall(s) in the sensor(s) between the marker points. As will be discussed, the sensor or sensors are located in predetermined spaced relation to the heater or heaters, but preferably physically separated therefrom so that the proximate influence of the solid heater material(s) is reduced and the coupling of the heater with the sensor or sensors by the fluid of interest is relatively enhanced.

The preferred embodiments of the approach of the invention contemplate disposing spaced microspec sized heating and sensing elements in a relatively static (zero flow) sample of the fluid of interest. The microsensor system or "microbridge" system, as it will be referred to herein, though not limiting, is presently preferred for several reasons. The system is extremely fast reacting, is very accurate, very sensitive because of its advantageous coupling to the fluid of interest and small and adaptable to a variety of configurations.

The microbridge chip sensor contemplated, for example, in certain embodiments preferred for the invention may resemble the form of one or more of the microbridge systems illustrated in the patents identified above. Such a system is exemplified by FIGS. 1-5 taken from Patent 4,501,144. A discussion of that example will now be presented as it will be helpful in understanding the present invention. While the present discussion is believed sufficient, to the extent necessary, any additional material contained in the microbridge related patents cited is deemed to be incorporated herein by reference.

The illustrated embodiment of FIGS. 1-5 contemplates a pair of thin film temperature sensors 22 and 24, a thin film heater 26 and a base 20 supporting the sensors and heater out of contact with the base. Sensors 22 and 24 are disposed on opposite sides of heater 26. Body 20 is a semiconductor, preferably silicon, chosen because of its adaptability to precision etching techniques and ease of electronic chip producibility. The embodiment includes two identical temperature sensing resistor grids 22 and 24 acting as the thin film heat sensors and a centrally located heater resistor grid 26 acting as the thin film heater.

Figure 8:
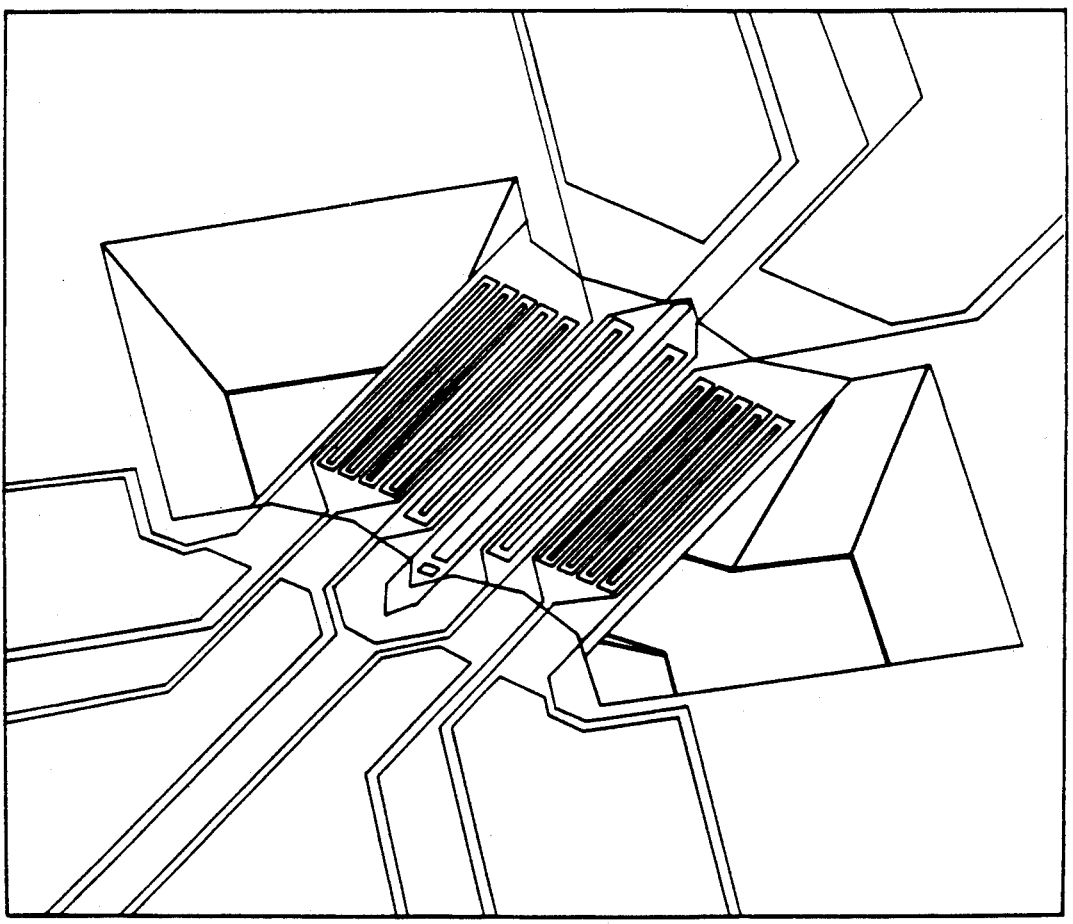

Sensors 22 and 24 and heater 26 may be fabricated of any suitable, stable metal or alloy film. In FIG. 8, the metal used was a nickel-iron alloy sometimes referred to as permalloy, with a composition of 80 percent nickel and 20 percent iron. The sensor and heater grids are encapsulated in a thin film of dielectric, typically comprising layers 28 and 29 and preferably silicon nitride, $Si_3N_4$, to form thin film members. In the embodiment shown in FIGS. 1 and 2, the sensor comprises two thin film members 32 and 34, member 32 comprising sensor 22 and 34 comprising sensor 24, each member comprising one-half of heater 26 and having a preferred dimension of 150 microns wide and 400 microns long.

The embodiment of the system further describes an accurately defined air space 30 which contemplates air space effectively surrounding elements 22, 24, 26. The effectively surrounding air space is achieved by fabricating the structure on silicon surface 36, thin film elements 22, 24 and 26 having a preferred thickness of approximately 0.08 to 0.12 micron with lines on the order of 5 microns wide and spaces between lines on the order of 5 microns, the elements encapsulated in a thin silicon nitride film preferably having a total thickness of approximately 0.8 microns or less, and by subsequently etching an accurately defined air space, of about 100 microns deep, into silicon body 20 beneath members 32 and 34.

Figure 1:
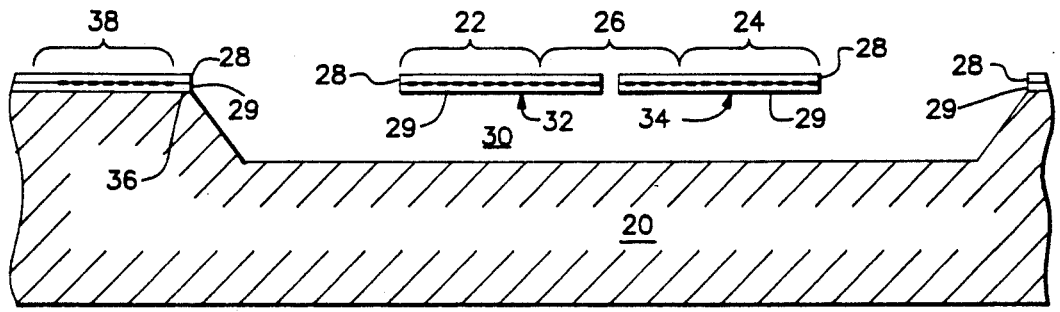
FIGS. 1, 2, and 3 are different views of a prior art embodiment of a microrobridge sensor, used to sense flow
Figure 2:
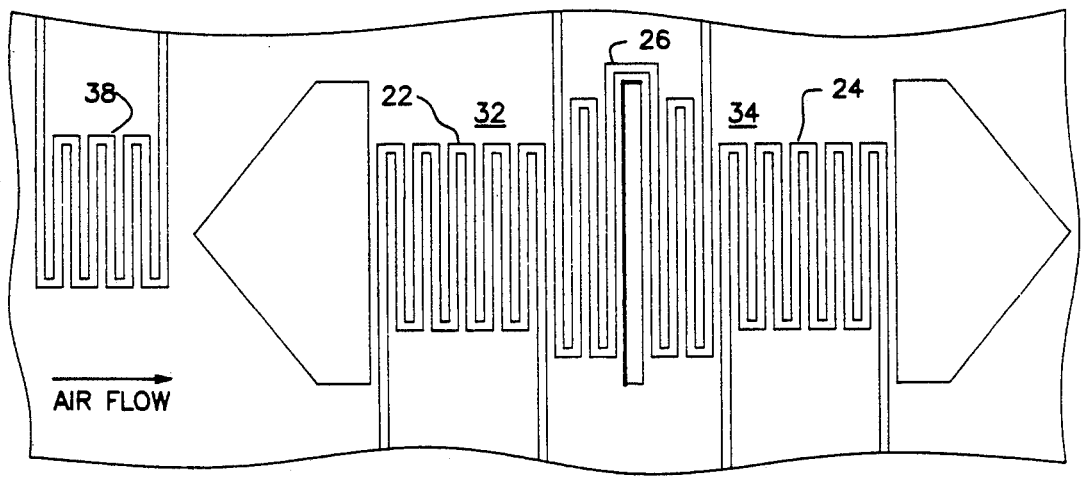
Figure 3:
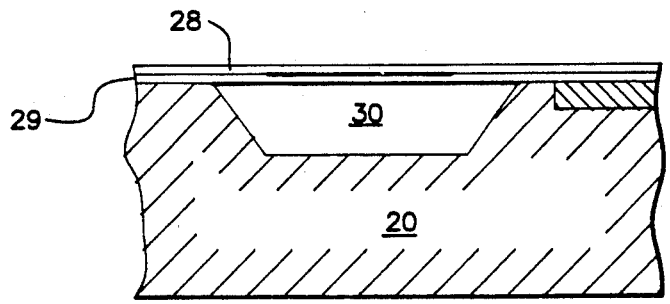
Figure 4:
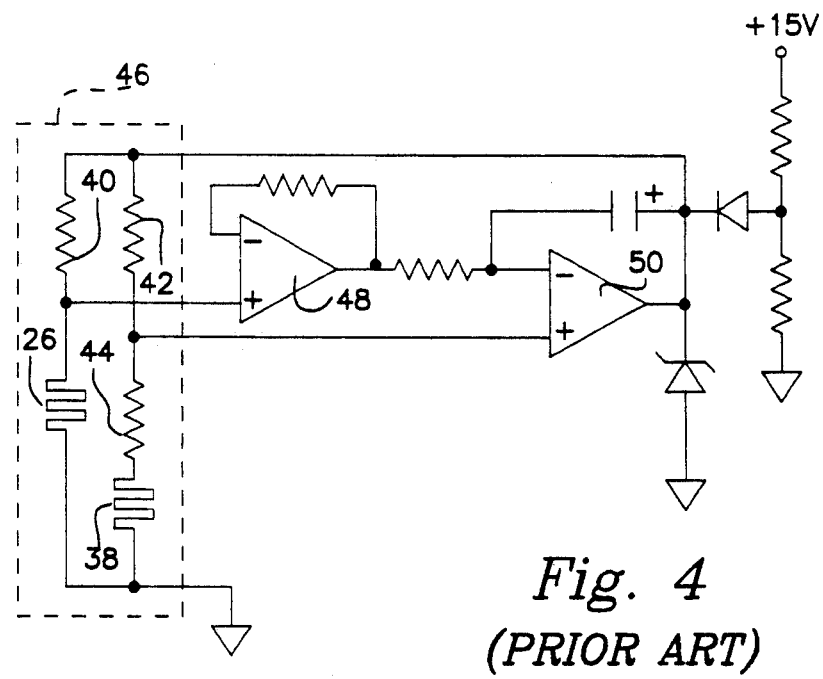

Members 32 and 34 connect to top surface 36 of semiconductor body 20 at one or more edges of depression or air space 30. As illustrated in FIG. 3, members 32 and 34 may be bridged across depression 30; alternately, for example, members 32 and 34 could be cantilevered over depression 30.

Heat flows from the heater to the sensor by means of both solid and fluid couplings there between. Of note is the fact that silicon nitride ($Si_3N_4$) is a highly effective solid thermal insulator. Because the connecting silicon nitride film within members 32 and 34 is a good insulator, heat transmission through the solid does not dominate the propagation of heat from heater 26. This further enhances the relative amount of the heat conducted to sensing resistor 22 and 24 from heater resistor 26 by flow through the surrounding fluid rather than through the supporting nitride film. Moreover, the supporting silicon nitride film has a low enough thermal conductivity that sensing resistor grids 22 and 24 can be located immediately adjacent or juxtaposed to heating resistor grid 26. Thus, sensing resistor grids 22 and 24 are in effect suspended rigidly in the air space proximate heater resistor 26 and act as thermal probes to measure the temperature of the air near and in the plane of heater resistor grid 26.

The operation of the system in sensing air flow is described in detail in the above-referenced U.S. Pat. No. 4,501,144. Typical circuit implementation is discussed briefly with reference to FIGS. 4 and 5 to add some insight. The heater control circuit illustrated in FIG. 4 uses a Wheatstone bridge 46 which further typically includes heater resistor 26 and a resistor 40 in its first leg and a resistor 42, heat sink resistor 38, and a resistor 44 in its second leg. An error integrator includes amplifiers 48 and 50 keeps bridge 46 balanced by varying the potential across it and thus the power dissipated in heater resistors 26.

Figure 5:
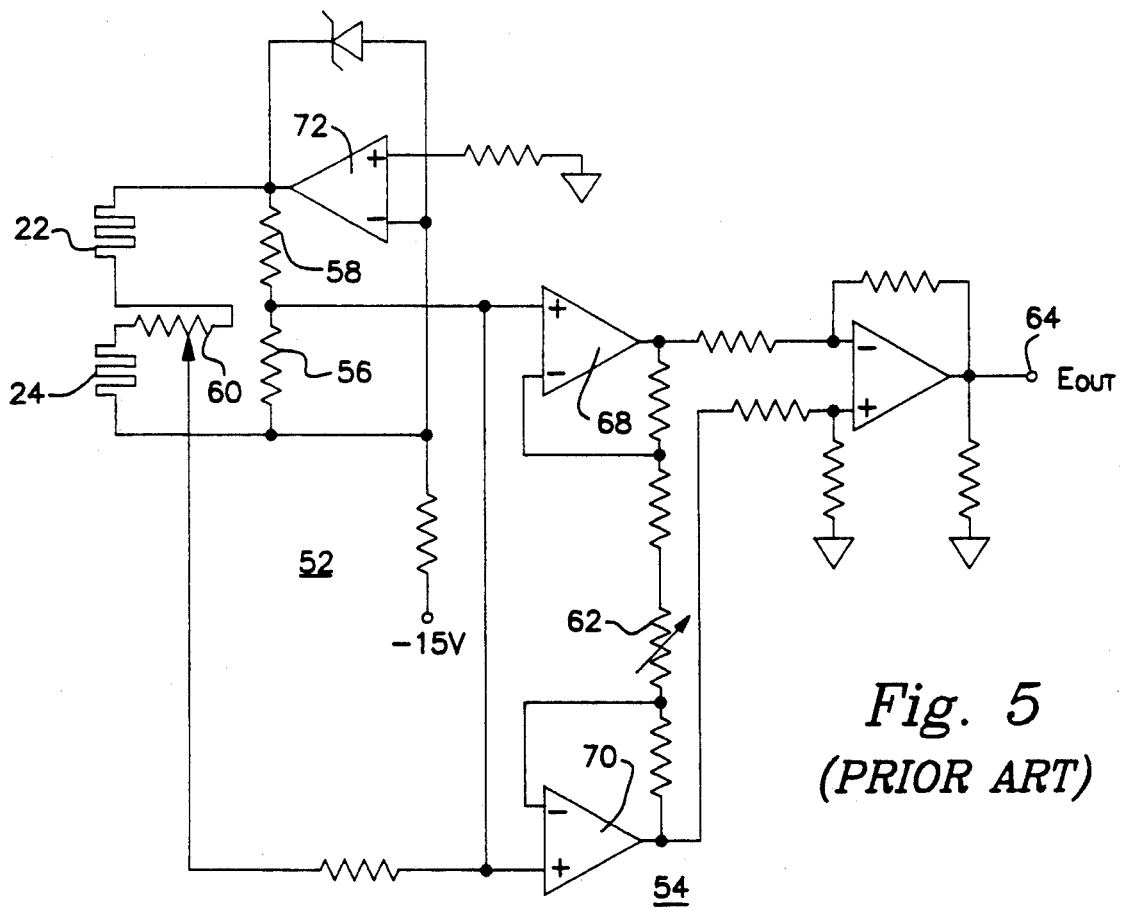

The circuitry of FIG. 5 monitors the resistance difference between downstream sensor 24 and upstream sensor 22. This circuitry includes a constant current source 52 comprising an amplifier 72 and a differential amplifier 54 further including amplifiers 68 and 70. The constant current source drives a Wheatstone bridge comprising two high impedance resistors 56 and 58 in one leg and the two sensing resistors 22 and 24 with a nulling potentiometer 60 in the other leg. The gain of differential amplifier 54 is adjusted by potentiometer 62. Output 64 provides an output voltage that is proportional to the resistance difference between the two sensing resistors 22 and 24.

To get some concept of the small size of the microbridge, the power required by heater resistor to heat such a device 200° C., for example, above ambient temperature is less than 0.010 watt. The exceedingly small thermal mass of the heater and sensor element structures, their excellent coupling to the surrounding fluid because of a high surface/volume ratio, and the thermal insulation provided by the thin silicon nitride connecting them to the supporting silicon body, and the surrounding air space, all contribute to produce a system well suited to fast and accurate sensing. Response time constants as short as 0.005 second have been measured. Consequently, sensor elements can respond very rapidly to proximate environmental changes.

Figure 7A:
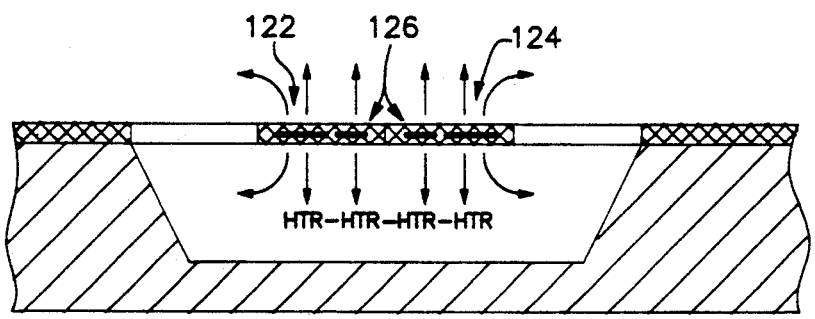
FIGS. 7a, 7b, and 7c, represent several heater/sensor configurations of microbridge systems in accordance with the invention.
Figure 7B:
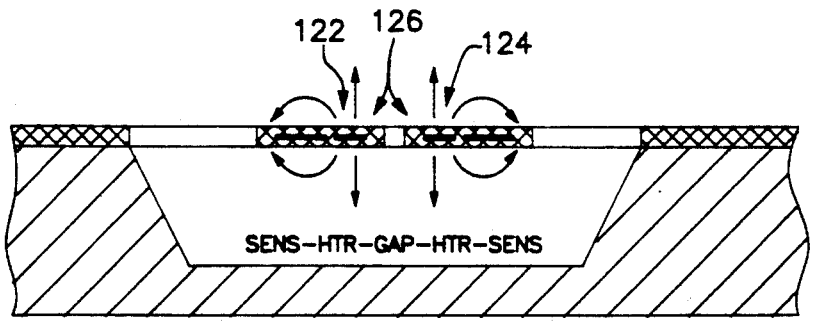
Figure 7C:
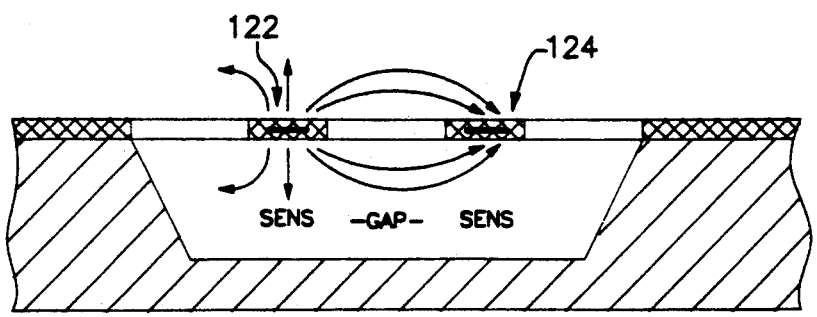

Now with reference to the implementation of the present invention, FIGS. 7a, 7b, and 7c, depict three slightly differing embodiments or configurations which were taught in copending applications Ser. No. 210,892 and Ser. No. 211,200 mentioned above, and are representative in terms of number and arrangement of the heaters and sensors which can be used in implementing this invention. In FIG. 7a, in contrast to FIG. 1, all of the elements 122, 124 and 126 are used as heaters. FIG. 7b is an embodiment which is similar to the embodiment of FIG. 1 with thin film element 126 acting as heater and elements 122 and 124 acting as sensors. The embodiment of FIG. 7c, represents the preferred arrangement in which the element 122 acts as heater and element 124 acts as sensor. The effective gap and thus the thermal isolation between heater and sensor is desirably wider in the embodiment of FIG. 7c.

The actual general geometric structure of the embodiments of FIGS. 1-3, and 7a-7c is more clearly illustrated in the scanning electron micrograph (SEM) photo of FIG. 8. The precision with which the cavity and bridge elements are defined and located in spaced relation, as FIG. 8 depicts, is particularly noteworthy. The SEM represents a magnification such that the indicated length of 0.010" appears as shown.

In the implementation of the invention disclosed herein particular attention is directed to (1) setting specific temperature markers in the sensor to determine the time periods needed for achieving the corresponding temperature changes, (2) using temperature sensors which are physically separated from the heater so that the direct influence of the heater and heat conducted to the sensor other than via the fluid of interest is reduced, and (3) using a pulse which reaches at least a momentary steady-state plateau to determine k, which then is used with the transient measure to determine $c_p$.

FIG. 6 graphically depicts a square wave electrical energy pulse 130 to the heater as at 126 which results in quasi square wave heat pulses released by the heater. These in turn, result in reactive curves as at 131, 132 and 133 at the sensor which vary as described below. The pulse applied to the heater, for example, may have a height of about 4 volts with a pulse width of 100 ms. Since the heater is closely coupled through the fluid medium to the sensors, the family of curves 131, 132 and 133 resembles the shape of the input pulse 130. They show the heat response in the sensors 122 and 124. FIG. 11 represents an oscilloscope trace showing temperature rise and fall versus time for dry air at atmospheric pressure. It uses a different scale for time than does FIG. 6, but illustrates the curve form produced by the pulsed input. The curves generally include beginning and ending transient portions flanking a relatively steady-state central portion. The relatively quick response of the sensor allows a relatively long steady-state to exist even with a pulse of 100 ms. Of course, the curves are affected by factors such as pressure and temperature as they influence the effective thermal conductivity and specific heat of the particular fluid of interest.

Heat flowing from the heater element or elements to the sensor element or elements is conducted both through the fluid and through the solid semiconductor element support substrate or the like. It is advantageous with respect to the measurement of k or $c_p$ of the fluid of interest that the amount of heat reaching the sensor through the solid connections be minimized so that substantially all the measured thermal effect is generated via the fluid of interest.

With respect to the transfer of heat to the sensor(s) some background information regarding the propagation of heat or temperature waves is presented. The speed of propagation, v, of a one dimensional wave (if it features an exponential decay profile) is constant and given by the expression:

$$v = D_T/a = (D_T/b)^{0.5}, \qquad (9)$$

where:
 a is an exponential decay (length) constant
 b is the rise time constant at a fixed location and
 $D_T$ is the thermal diffusivity.

A complete list of nomenclature and subscripts with units appears in Table 3, below. $D_T$ is related to k and $c_p$ by the expression $$D_T = k/c_p \qquad (10)$$

$D_T$, therefore, if known, may be a key to obtaining $c_p$. The rise time constant, b, was measured to be about 4 msec. For typical gases, $D_T$ ranges from 1.7 cm²/s for He to 0.054 cm²/s for $C_3H_8$. Metals exhibit high values such as 1.7, 1.1 and 0.18 cm²/s respectively for Ag, Cu and Fe. Insulators, however, are even lower than the gases at 0.004 cm²/s for glass and 0.0068 cm² for $Si_3N_4$ which, as discussed above, is a good insulator. The propagation speed, v, in a typical gas sample then is about $(1/0.004)^{0.5} = 15$ cm/s. This compares with $(0.0068/0.004)^{0.5} = 1.3$ cm/s for $Si_3N_4$, assuming that the same rise time constant of about 4 ms is applicable to both the one measured in the $Si_3N_4$ and the actual one in the gas.

The effect is that the influence of the temperature wave propagating from one thin film strip, that is, the heater, to a second thin film strip, the sensor, both being embedded in a membrane of $Si_3N_4$, is faster for the gas than for the $Si_3N_4$ This also supports the choice of a material such as $Si_3N_4$, since it reduces the contribution of heat flow through the solid media. This is beneficial to the accuracy of the system.

Typical microbridge embodiments are illustrated by FIGS. 7a-7c. They will now be explained in greater detail.

TABLE 3
NOMENCLATURE

| Symbol | | Units |
|---|---|---|
| $a_1-a_n$ | Exponential Decay Constant<br>Constant | cm |
| A | Area of Heat Transfer to Microbridge or to Gas | $cm^2$ |
| b | Rise Time Constant at a Fixed Location | °C./s |
| $c_p$ | Specific Heat | $cal/(cm^3 °C.)$ |
| $D_T$ | Thermal Diffusivity, $D_T = k/c_p$ | $cm^2/s$ |
| k | Thermal Conductivity | $cal/(sm °C.)$ |
| L | Length of Thermal Conductance Path in Gas or Solid | cm |
| P | Pressure of Gas | psia |
| Q | Power of Heat Release Rate | watts |
| $R_o$ | Resistance at Room Temperature | ohms |
| t | Time | s |
| T | Absolute Temperature | °C. |
| U | Bridge Output or Amplified Bridge Output | V |
| V | Volume of Gas or Solid (Microbridge) | $cm^3$ |
| v | Speed of Propagation | cm/s |
| x | Temperature coefficient of resistance | $°C.^{-1}$ |
| SUBSCRIPTS | | |
| c | Conduction | |
| S | Microbridge or Solid | |
| g | Gas | |
| o | Room, Reference or Gas Temperature Without Microbridge Heating | |
| h | Heater or Hot | |
| m | Middle or Medium | |

The configuration of FIG. 7a involves using the same microresistance 122, 124, 126 for the heating pulse and the sensing task. In this embodiment of the resistive heater-sensor element may be one leg of a conventional resistive Wheatstone bridge in a control circuit.

FIG. 7b depicts an arrangement wherein the center microresistance structure 126 is used as a heater flanked by two symmetrically located outer sensing resistance elements 122 and 124. The elements 122 and 124 are separated from the heater 126 by a narrow gap.

FIG. 7(c) shows an embodiment configuration in which the left element of the bridge 122 is used as the heating element and the right element 124 as the sensor. This embodiment takes advantage of a rather large central gap to achieve improved thermal isolation between the heater and the sensor.

Figure 9:
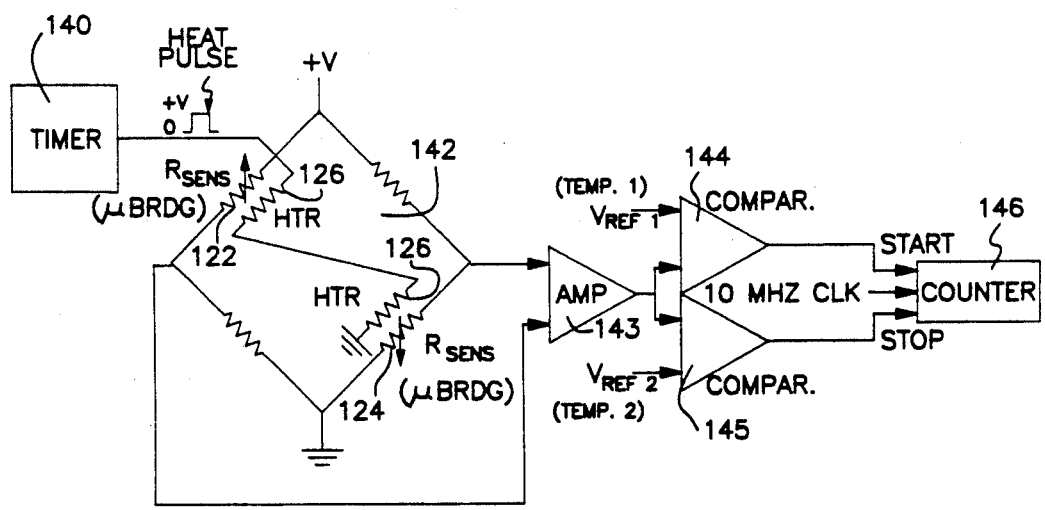

FIG. 9 shows a modified control circuit which uses the center microresistance 126 as heater, while the sensing task is performed by the two resistors 122 and 124. The dual heater sensor configuration corresponds to FIG. 7b and the circuit is representative of typical sensor/measurement circuit. FIG. 9 includes a timer 140 providing square-wave electrical pulses to the heater 126. The heater couples the heat pulse to the sensors 122 and 124 in the bridge 142. The output of the bridge is connected through an amplifier 143 to a pair of comparators 144 and 145 which operate "start" and "stop" inputs to a counter 146 which counts 10 mHz clock pulses. The counter counts measure the time interval ($t_2-t_1$) between temperatures $T_2$ & $T_1$ illustrated in FIG. 6.

Figure 9A:
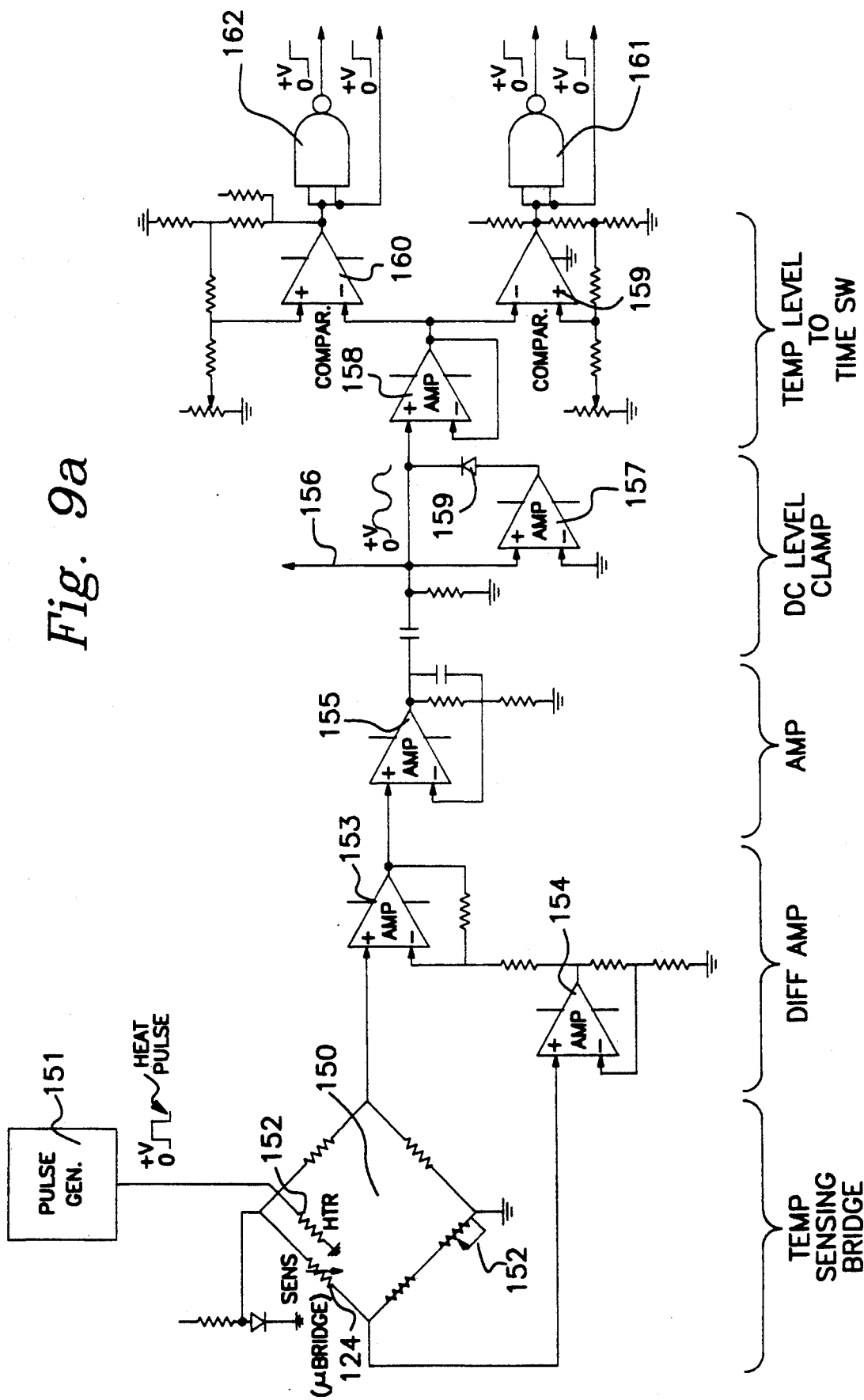
FIG. 9a is a more detailed circuit schematic with reference to FIG. 7c.

FIG. 9a is similar to FIG. 9, but more detailed. The bridge configuration is the heater-space-sensor configuration of FIG. 7c. The sensor resistance arm of the microbridge is set into a Wheatstone bridge 150 at 124. Another proximate resistive arm 122 is fed a voltage pulse from pulse generator 151 to provide a heat pulse into the microbridge element 126. The Wheatstone bridge 150 also may contain a nulling balancing resistor 152 which can be used in the manner of potentiometer 60 in FIG. 5 to initially zero the device. The microbridge resistor sensor 124 in the Wheatstone bridge receives the heat pulse from heater element 122 principally by thermal conduction through the surrounding fluid. Some conduction, of course, does occur through the solid microbridge substrate and surroundings.

The circuitry of FIG. 9a is conventional and can readily be explained with reference to its functional operation with regard to processing the bridge output signal. The voltage output signals of the bridge 150 are amplified by differential amplifiers 153 and 154 in a differential amplifier section. The imbalance signal is further amplified by a high gain amplifier at 155. The signal at 156 as is the case with the signal at 147 in FIG. 9 is in the form of a DC voltage signal, U, the amplitude of which is solely related to the thermal conductivity of the fluid of interest as will be discussed above.

The remainder of the circuitry of FIG. 9a includes a DC level clamping amplifier 157 and isolation amplifier 158. The temperature level, time-related switching and counting circuitry includes comparators 159 and 160 together with N and gates 161 and 16 having outputs which are connected to the counter timing device (not shown) as in FIG. 9. By measuring the time needed for the sensor temperature to rise or fall between two or more known temperature values or markers as represented by sensor resistance or bridge voltage outputs a measure related to the specific heat per unit volume, $c_p$ of the fluid of interest is obtained. The timing device may be a conventional 10 MHz pulse counter or the like. Again, this is illustrated schematically in FIG. 6.

The output signal from the Wheatstone bridge, U, represents the voltage imbalance caused by the temperature change in microbridge sensor or sensors induced by the corresponding heater pulse output. Because the magnitude of this imbalance is related directly to the amount of energy absorbed by the sensor or sensors, the amplitude of the signal is directly related to the thermal conductivity, k, of the conducting media in a manner next explained.

FIG. 6 shows that during much of the about 100 ms wide pulse period the temperature of the sensor reaches and maintains a constant value. During this time, the influence of the energy sink or source terms represented by specific heat are zero, which means that only thermal conductivity governs the value of the sensor temperature.

Figure 13:
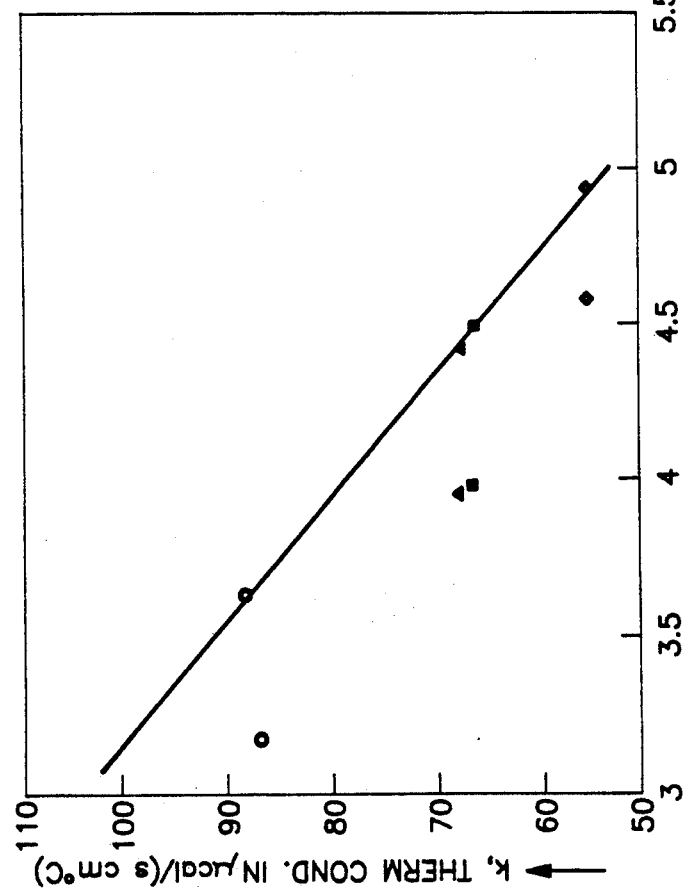

FIG. 12 is a plot of temperature rise in the form of bridge output, U, (FIG. 9 or 9a) using the sensing arrangement of FIG. 7(b) versus time in milliseconds for various gases at atmospheric pressure. Curves for methane, dry air, ethane and a vacuum are presented. In this specific embodiment there was a heater resistance of 800 ohms, a pulse height of 2.5 volts, and a pulse width of 100 ms. Temperature markers t, and $t_2$ are shown on the graph. These markers relate to those of FIG. 13 which shows a graphical presentation of heat up time versus pressure for several gases with a sensor-heater such as that shown in FIG. 7b and using the $T_2-T_1$, marked in FIG. 11.

The literature value of the thermal conductivity of several gases has been plotted vs. the measured sensor temperature expressed directly in terms of the measured Wheatstone bridge imbalance potential, U. This relationship has been derived empirically for a microbridge of the type depicted in FIG. 7(c) and is plotted in FIG. 13, using the least squares method in a multiple regression analysis to achieve the best fit curve. The relation can be linearized over a modest span sufficient for the purpose of the invention. Other combination configurations of heater/sensor embodiments can likewise be calibrated using known gases or gases of known k. Thus, using an off-the-shelf flow sensor of the type 7(c) in the circuit 9(a), a 4.0 V pulse of 100 ms duration was used.

This yielded an approximate linear relationship between U and $k_g$ of the form $$k_g = a_4 U + a_5 \quad (11)$$

where $a_4 = -25.8807$ and $a_5 = 181.778$ for the above conditions.

The above then achieves the calibration of the sensor for $k_g$. The linear approximation holds over enough of a span to provide accurate measurements. Similar relations may be derived under other measurement conditions including additional pressure correction terms.

Further details related to determining the coefficients for the algorithms to compute $c_p$ are described next. This determination requires that the measuring system be calibrated first, which consists of determining the coefficients $a_1$, $a_2$, and $a_3$, of the algorithm to then computer $c_p$.

Assuming a two-dimensional model for heat transfer in the microbridge, see FIGS. 7a-7c, the measured sensor temperature response may be described with reference to the following processes (at zero gas flow):

1) Heat release by the heater element film.
2) Temperature build up in the heater element material (FeNi or Pt) and surrounding support material (insulator $Si_3N_4$), i.e. within the bridge material.
3) Conduction towards the sensor via a) the bridge material, and b) the fluid phase surrounding the bridge.
4) Temperature build up in the sensor material (as in heater material in item 2 above), and in the gas surrounding it by the heat arriving via the above processes.
5) Achieving a steady-state distribution of temperature.
6) The revenue process to steps 1-5 during the start of the heater off-period.

Further assuming, for the sake of simplicity, that the specific heats of the involved gaseous and solid materials do not depend on temperature, we can approximately describe the above processes by the following expressions (see Table 2 above for symbol explanation) using the same process numbering as above:

1) $Q = V^2/(R_o(1 + (T_h - T_o)))$ for small temperature rises.
2) The heater temperature results from balancing the heat input and output rates: $T_h - T_o = Q/(k_s A_s/L_s + k_g A_g/L_g)$ with Q in watts; the temperature $T_h$ is established in a time that is short compared to the time it takes to reach the sensor if the sensor is not identical to the heater, as in configurations 7(b) and 7(c).
3) In a truly one-dimensional case most of 50% of the released power Q eventually arrives at the sensor, since it only has two ways to go (+x and −x directions). In a two- (or even three-) dimensional case a major part of Q gets dissipated in the y and z directions, so that only a fraction, $Q_c$, is conducted to the sensor, with a corresponding drop of the original temperature, $T_h$, down to an intermediate temperature $T_m$. The sensor then experiences an energy rate arrival of $$Q_c = (T_m - T_o)(k_s A_s/L_s + k_g A_g/L_g) \quad (12)$$

4) The sensor temperature rise rate is governed by the specific heat of the gas surrounding the sensor and the closely coupled material of the sensor itself so that:

$$Q_c = (dT/dt) c_{ps} V_s + (dT/dt) c_{pg} V_g \quad (13)$$

Figure 14:
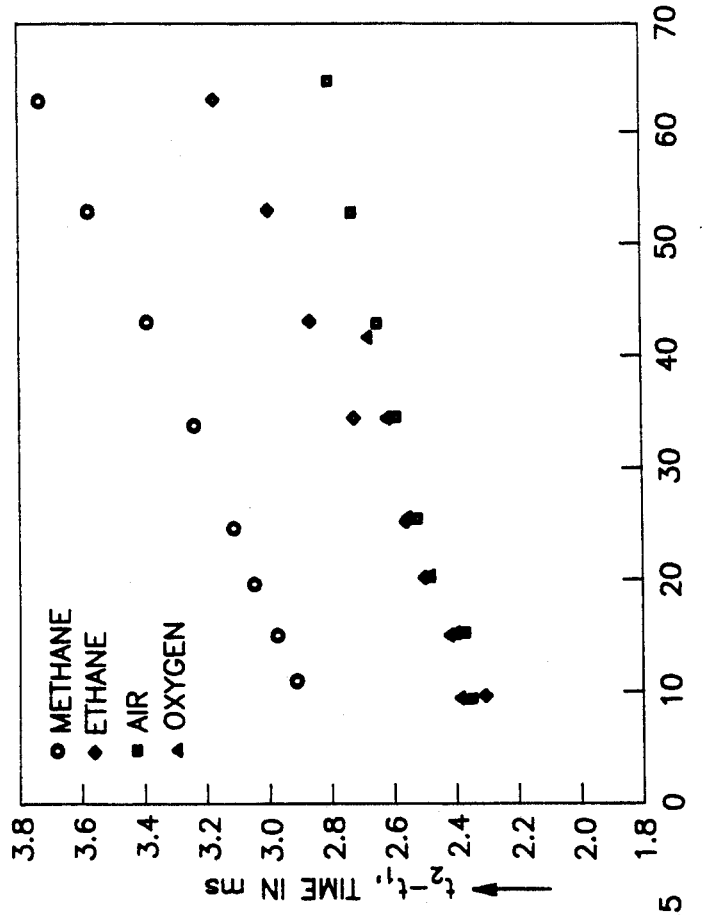
Figure 16:
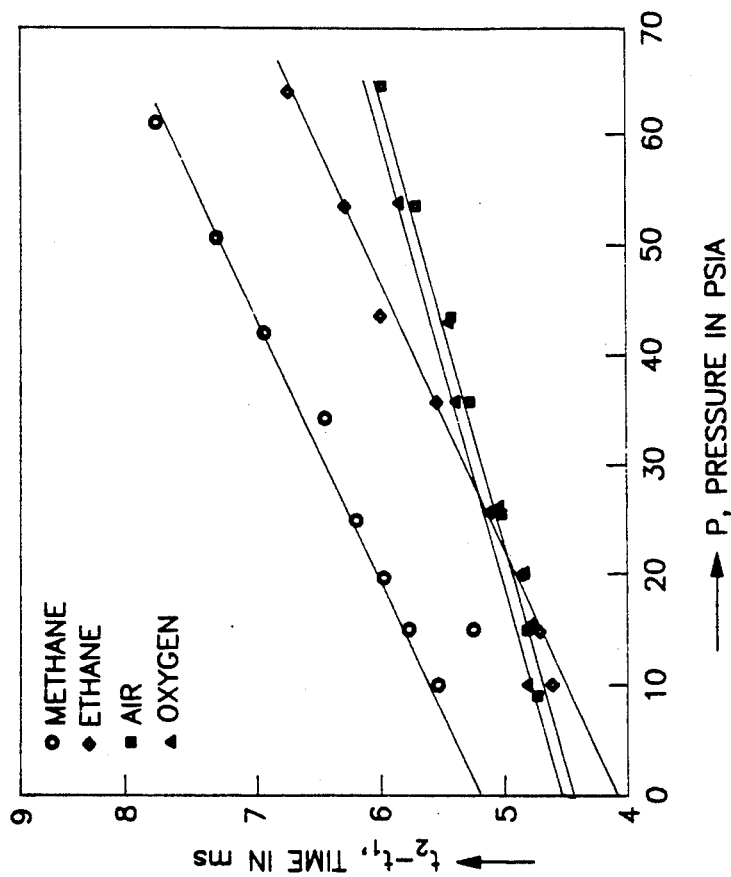
Figure 15:
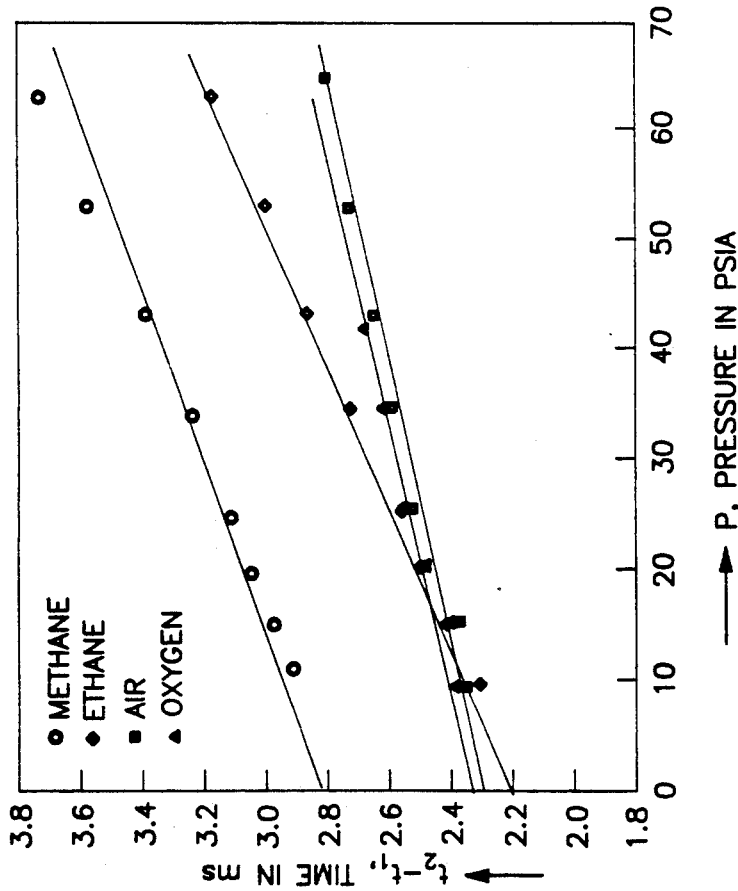
Figure 18:
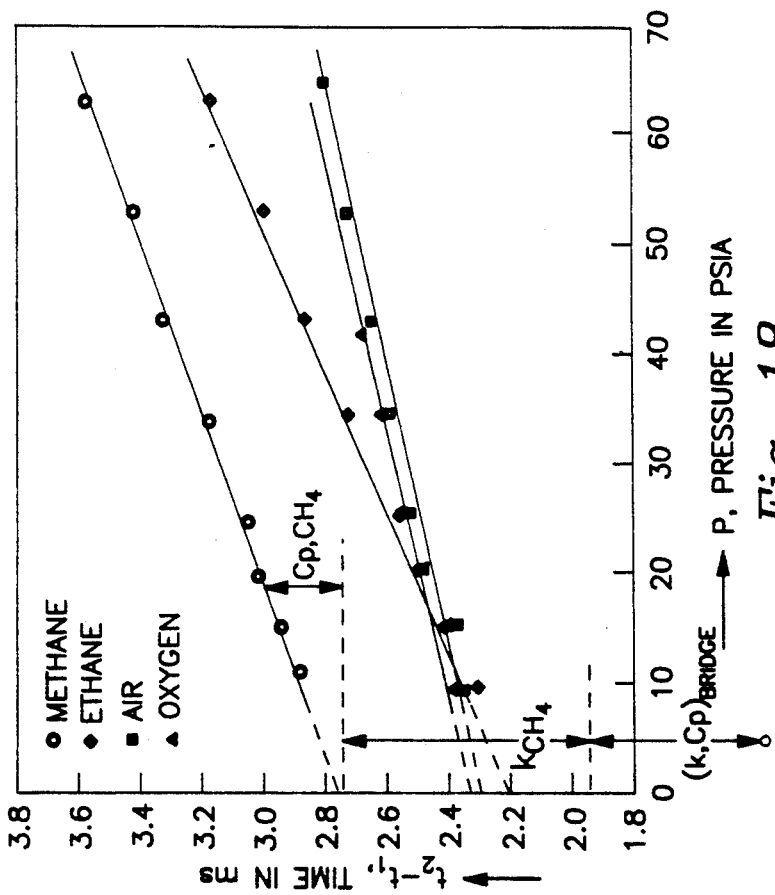

The quantity measured and plotted in FIGS. 14, 15 and 16, is the time (dt) needed to raise the sensor temperature by an increment (dT) which is chosen by the two or more sensor resistance value markers corresponding to $T_1$ and $T_2$.

It is readily apparent from equation (13) that $c_{pg}$ could be determined for an unknown gas if the various quantities entering in Eqs. (12) and (13) were either known or measurable. It has been found, however, that even if only dt, dT, $T_o$, P and $k_g$ are conveniently measurable, the other quantities may be determined by calibration. This can be done according to an invention as follows:

For calibration, gases of known composition (preferably but not necessarily pure) and therefore of known specific heat and thermal conductivity at the used pressure and temperature (both also measured), are brought in contact with the sensor. The effect of the pulsed heat releases is recorded in terms of the lapsed time, $t_2-t_1$, as has been described. After noting results for various gases, pressures, heater temperatures and/or heating/cooling periods, with pulses of constant temperature, voltage, current or power, the recorded time and condition data are entered into an array of data ports which can be used for automatic or computerized data processing or other number crunching techniques.

The process can be illustrated with the help of equations (12) and (13), by way of example, without excluding other, similar approaches likely to occur to one skilled in numerical analysis. With this in mind, the following ports receive data or input for various gases, pressures (and temperatures):

| Ports: | Y | X1 | X2 |
|---|---|---|---|
| Inputs: | $c_{pg}P/P_o$ | $(t_2-t_1)k_g$ | $t_2-t_1$ |

Known and available multiple linear regression analysis (MLRA, see FIG. 10) program can determine the linear coefficients $a_1$, $a_2$, and $a_3$ (e.g., by matrix inversion), which, together with the above input data, forms the calibrated expression derived from equations (4) and (5) to compute specific heat, $c_p$:

$$c_{pg}P/P_o = a_1(t_2-t_1)k_g + a_2(t_2-t_1) - a_3 \quad (14)$$

The determined (calibration) coefficients, of course, represent the lumped factors of several sensor properties or conditions from equations (14) and (15):

$$a_1 = (T_m - T_o)(A_g/L_g)/(V_g dT), \quad (15)$$
$$a_2 = (T_m - T_o)(A_g/L_s)/(V_g dT)k_s,$$
$$a_3 = c_{ps} V_s/V_g$$

In order to minimize differences in $T_m$ at the sensor location, the most advantageous operation from among constant temperature, voltage, current or power is chosen. The above method is demonstrated on the basis of 1) constant voltage pulses, which result in quasi square wave heat pulses released by the heater, and 2) changes in gas type ($CH_4$, $C_2H_6$, air and $O_2$) and pressure; the chosen configuration was 7(b).

FIG. 14 shows the result of storing and plotting the $dt = t_2 - t_1$ and pressure data for each of the gases used, for which the $c_p$ and k values can be obtained from the open literature. This relation is linearized by applying the least squares method in a multiple linear regression analysis to achieve the best fit line. After entering these data into the above ports Y, X1 and X2, the regression analysis program performed. The obtained result was, for a configuration as in FIG. 7(b):

$$a_1 = -16509, a_2 = 3.5184 \text{ and } a_3 = 0.005392 \quad (15a)$$

Proof that the above calibration coefficients are valid is provided by FIG. 15, for example, in which these coefficients have been used to generate the shown lines for $CH_4$, $C_2H_6$, air and $O_2$. As shown, the lines indeed connect and agree with all experimental points. Additional lines have been plotted with the $c_p$ and k data of the literature for other gases as well.

The final step in using this calibration method involves known means to store, write or burn in the obtained, tailored values of $a_1$, $a_2$ and $a_3$ for the individual microbridge, which may be a Honeywell MICRO-SWITCH Model No. AWM-2100V, into the memory linked to it. The microsensor is then ready for use to measure the specific heat of unknown gases, provided that P and k be known at the time of measurement.

Figure 10:
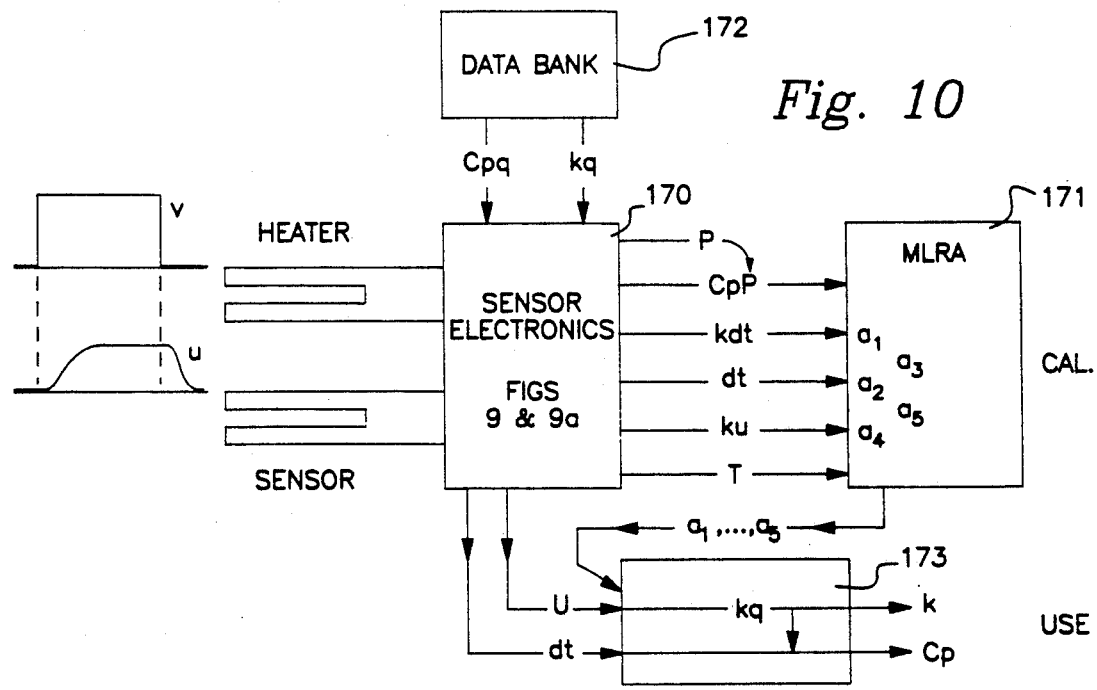

FIG. 10 depicts a schematic block diagram of a device for measuring $c_p$ and k. The system includes the signal processing circuitry indicated by 170, a multiple linear regression analysis (MLRA) unit 171 for deriving the known equation constants for the particular microbridge configuration and circuitry used, i.e., $a_1 - a_n$, a data bank 172 for storing calibration $c_p$ and k data and an output interface unit 173.

With respect to the embodiment of FIG. 10, prior to use, field recalibration may be accomplished simply by entering the P, $c_p$ and k values of the test gas into the data bank. If P cannot be measured independently of the sensor already in the subject system its errors can be incorporated as a correction in the $c_p$ and k recalibration. The measured values of U and dt are then used as in the measurement mode to determine sensor values of k and $c_p$. If they disagree from the entered values the constants $a_3$ and $a_5$ may be modified to fit the entered or book values.

This approach may be a practical one for field use, but it should be checked by using a second test gas. If that agrees, the recalibration may be completed. If not, a complete calibration of all $a_1$–$a_5$ coefficients should be made.

It should be mentioned that in all of the above discussion the influence of temperature was not mentioned for the sake of simplicity. It is well known, however, that temperature does influence both $c_p$ and k but can be addressed, if necessary, in one of the following ways:
1) Controlled, (expensive and energy consuming) or
2) Compensated by special temperature-sensitive elements in the analog part of the circuit, or
3) Entered into the sensor algorithm as an additional parameter, which is sensed, e.g., by monitoring one of the many available temperature dependent resistors on the sensor. This is the preferred approach for sensing systems requiring maximum accuracy.

With respect to use of the instrument of FIG. 10, the U and $dt = t_2 - t_1$ (and P) signals obtained for an unknown gas are processed as follows in this mode:
1) Computation of k from expression (3) using the coefficients $a_4$ and $a_5$ which have been stored in (or burned into) the sensor's memory after calibration, and
2) Computation of $c_p$ from expression (6). It should also be noted that a pressure signal is also needed as a basic ingredient since $c_p$ is used here in relation to a volume of gas as opposed to k which is largely pressure independent if the sensor is used at or above atmospheric pressure, at which the gas mean free path is small compared to the characteristic dimensions of the involved sensor.

Figure 17:
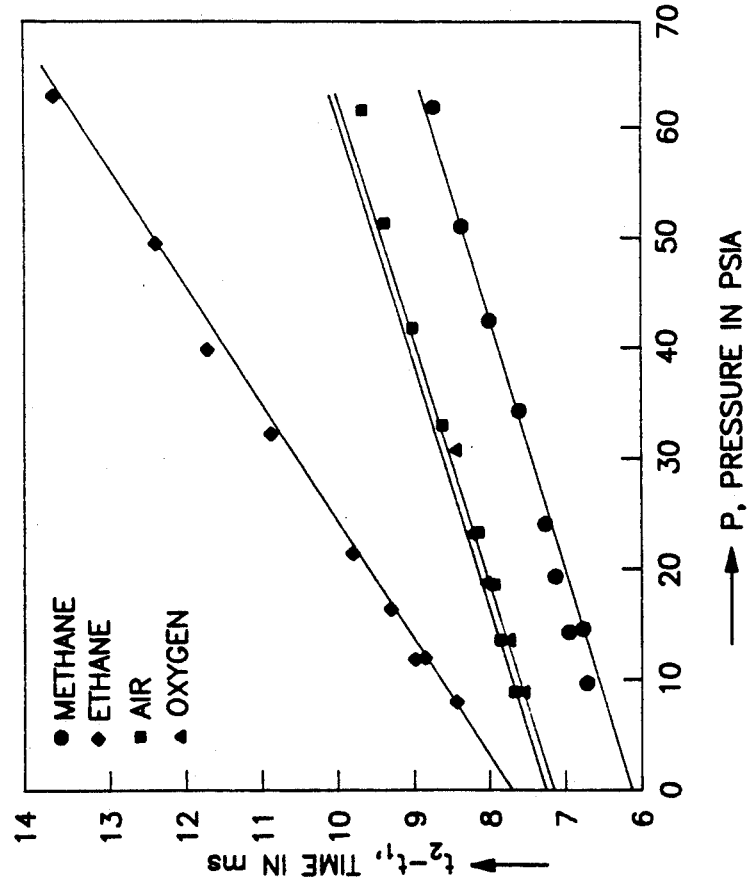

The graphical presentation of FIG. 16 depicts heating time in milliseconds versus pressure and gas type and specifically showing curves for methane, ethane, air and oxygen. The sensing configuration of FIG. 7(c) was used. In this example, the pulse height was 1.75 volts with a pulse width of 100 ms. and the heater and sensor resistance each being about 2000 ohms. FIG. 17 depicts a cooling curve for the same configuration as FIG. 16. Conditions were the same except that the pulse height was 4.0 volts.

Of course, the output of the device can be in any desired form including analog or digital signals, printed records, etc., after the value is obtained.

I claim:

1.) An apparatus for determining fuel gas pressure using a non membrane-based microsensor for a gas at unknown conditions comprising:

a non membrane semiconductor microbridge structure supported by a substrate having an electrically energizable heater film element thereon and resistive sensor film element(s) located proximate to the heater film element such that said structure and substrate are so arranged and disposed so that they maintain contact. with the fuel gas of interest being immersed therein and such that when an electrical energy pulse source supplies an electrical energy pulse to said heater film element of sufficient time duration (also called pulse width) and power, the pulse causes a resulting transient temperature rise followed by a steady-state temperature (dU) in said gas of interest, to a degree detectable by said sensor element(s) such that said sensor element(s) produce an imbalance output corresponding to the voltage imbalance due to change in resistivity between said sensor element(s) and balancing resistor element(s);

$W_{hc}$ measuring means for measuring heater power, $W_{hc}$, required to achieve a constant differential, dT, above ambient temperature and for producing an output representative of this value $W_{hc}$;

S measuring circuit for measuring occurrences of changes in said imbalance output which are characteristic of the transient temperature rise signal, s, and means for determining its integral S for each occurrence and for producing an output representative of this value S;

dU measuring circuit for measuring the amplitude of the steady-state temperature signal, dU, from said imbalance output and for producing an output representative of this value dU;

$T_g$ measuring sensor means for measuring gas temperature at the location of the structure substrate ($T_g$) and producing a signal representative thereof;

a computing device connected to received said signals dU, $W_{hd}$, $T_g$ S, and employing signal processing circuitry, data, and processing components, said computing device configured to have k computing means, $c_p$ computing means and p computing means, having;

k computing means for representing a function to compute thermal conductivity, k, of said gas of interest as a function of the measured signals representing dU, $W_{hc}$ and $T_g$ (gas temp.);

$c_p$ computing means for representing a function to compute specific heat, $c_p$, as a function of the measured signals representing dU, $W_{hc}$, S, and $T_g$; and p computing means for representing a function to compute pressure, P, of said gas of interest, according to a relation:

$$P = V_{mo} (T/T_o) (P_o) C_{pv}/c_p$$

where $c_p$ = specific heat, molar or weight -based and having been determined by said $c_p$ computing means, $c_{pv}$ = volumetric specific heat, measured $V_{mo}$ = molar volume of ideal gases = 22415 cm$^3$/mol @ 0° C. and 1 atm T = sensed gas temperature in degrees K $T_o$ = gas temperature at the reference condition of 0° F. or 273.15°K.

$P_o$ = gas pressure at the reference condition of 1 atm, and an output device connected to said computing device which outputs said electrical signals representative of at least one of said k, cp, and P values.

2. The apparatus according to claim 1 in which in the microbridge structure there are first and second resistive sensor films located on opposite sides of and proximate to the heater film.

3. The apparatus according to claim 1 in which the integral S is computed by said determining means for the temperature rise (i.e., heating) part of the heat pulse.

4. The apparatus according to claim 1 in which the electrical energy pulse to the heater film approximates a square wave electrical energy pulse.

5. The apparatus according to claim 4 in which the pulse width of the electrical energy pulse is on the order of 100 milliseconds.

6. The apparatus according to claim 5 in which the electrical energy pulse applied to the heater film has a height on the order of 4 volts.

7. A method to determine fuel gas pressure using a non membrane-based microsensor for gases including the steps;

providing a non membrane semiconductor microbridge structure supported by a substrate, the structure having an electrically energizable heater film element thereon and resistive sensor film elements located proximate to the heater film;

locating the structure in immersed contact with the fuel gas to be sensed for determining gas pressure;

providing an electrical energy pulse source means for supplying an electrical energy pulse to said heater film element of sufficient time duration and power to cause a resulting transient temperature rise in said gas followed by a steady-state temperature in said gas, both said rise and said steady-state temperature level being measurable by said sensor(s) so as to produce an imbalance output corresponding to the voltage imbalance due to change in resistivity between said sensor element(s) and balancing resistor element(s);

measuring heater power, $W_{hc}$, required to achieve a constant differential, dT, above room temperature;

receiving said sensor(s) signal output and from it:

measuring temperature rise time, dT, between two temperature markers related to values said imbalance signal may achieve;

measuring the sensor steady-state temperature signal, dU based on said imbalance output;

measuring gas temperature at the structure substrate, $t_g$; and then computing thermal conductivity, k, as a function of dU, $W_{hc}$ and $T_g$ (gas temp.);

computing specific heat, $c_p$, as a function of dU, $W_{hc}$, S (or dT) and $T_g$; and determining pressure, P, according to a relation:

$$P = V_{mo} (T/T_o) (P_o) C_{pv}/c_p$$

where $c_p$ = specific heat, -based and having been determined by said $c_p$ computing means, $c_{pv}$ = volumetric specific heat, $V_{mo}$ = molar volume of ideal gases = 22415 cm$^3$/mol @ 0° C. and 1 atm T = sensed gas temperature in degrees K.

$T_o$ = gas temperature at the reference condition of 0° F. or 273.15°K.

$P_o$ = gas pressure at the reference condition of 1 atm, and then outputting a signal whose value is representative of at least one of $c_p$, k, P.

8. The method according to claim 7 and further comprising the step of: measuring one, the other, or both, ambient or electronics temperature, called, collectively, $T_e$; and in which the step of computing thermal conductivity is expanded to read "computing thermal conductivity k, as a function of dU, $W_{hc}$ and $T_g$ (gas temp.) while compensating for $T_e$;" and in which the step of computing specific heat, $c_p$, is expanded to read "computing specific heat, $c_p$, as a function of dU, $W_{hc}$, S (or dT) and $T_g$ while compensating for $T_e$;".

9. The method according to claim 7 in which in the step of providing a microbridge structure there are first and second resistive sensor films located on opposite sides of and proximate to the heater film.

10. The apparatus according to claim 1 in which the integral S is computed by said determining means for the cooling part of the heat pulse.

11. The method according to claim 7 in which the electrical energy pulse to the heater film approximates in form a square wave electrical energy pulse.

12. The method according to claim 11 in which the electrical energy pulse width is on the order of 100 milliseconds.

13. The method according to claim 12 in which the electrical energy pulse applied to the heater film has a height on the order of 4 volts.

* * * * *